UNITED STATES PATENT OFFICE 2,670,358

14 ALPHA-HYDROXYPROGESTERONE

Herbert C. Murray, Hickory Corners, and Durey H. Peterson, Kalamazoo, Mich., assignors to The Upjohn Company, Kalamazoo, Mich., a corporation of Michigan No Drawing. Application August 28, 1952, Serial No. 306,924

1 Claim. (Cl. 260—397.45)

This invention relates to steroids and more particularly to 14α-hydroxyprogesterone.

The novel compound of the present invention, 14α-hydroxyprogesterone represented by the formula:

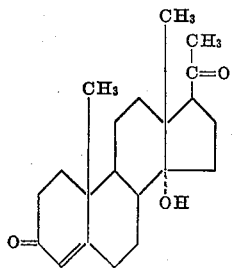

may be prepared by exposing progesterone to the oxygenating action of the fungus *Helicostylum piriforme*, a species of the genus Helicostylum of the family Thamnidiaceae, or to the oxygenating action of the fungi *Mucor griseocyanus* or *Mucor parasiticus*, species of the genus Mucor of the family Mucoraceae, all of the order Mucorales, as described in the applications, of which this is a continuation-in-part, Serial No. 297,242, filed July 5, 1952; Serial No. 272,944, filed February 23, 1952, and issued as U. S. Patent 2,602,769; and Serial No. 180,496, filed August 19, 1950, and now abandoned.

It is an object of the present invention to provide 14α-hydroxyprogesterone. Other objects will be apparent to those skilled in the art to which this invention pertains.

The compound of the present invention can be converted to the known 21-acetoxy-14-pregnene-3,20-dione [Meyer et al. Helv. Chim. Acta, 30, 1508 (1947)] by hydrogenating 14α-hydroxyprogesterone (4-pregnene-14α-ol-3,20-dione) in the presence of a palladium-charcoal catalyst to produce pregnane-14α-ol-3,20-dione and selectively reducing the latter with sodium borohydride to yield pregnane-3,14α-diol-20-one. Bromination of pregnane-3,14α-diol-20-one with bromine in chloroform produces 21-bromopregnane-3,14α-diol-20-one and the latter can be acetoxylated with potassium acetate in acetone to produce 21-acetoxypregnane-3,14α-diol-20-one. The 21-acetoxypregnane-3,14α-diol-20-one can be readily dehydrated with anhydrous oxalic acid to prepare 21-acetoxy-14-pregnene-3-ol-20-one whereupon oxidation of the 21-acetoxy-14-pregnene-3-ol-20-one with chromic acid in acetic acid yields the known 21-acetoxy-14-pregnene-3,20-dione.

The compound of the present invention possesses lyophobic and an increased proportion of lyophilic groups causing the compound to be a valuable interfacial tension modifying agent useful as an emulsifying agent, emulsion breaker, suspending agent, and emulsion stabilizing agent. The compound may be used to prepare absorption bases having improved water absorption and emollient characteristics of utility in pharmacy and cosmetology alone, or as a carrier for known medicaments. A suitable absorption base preparation may be made by melting together a mixture of 85 percent white petroleum, stearyl alcohol, and five percent oxygenated steroid, 14α-hydroxyprogesterone, and cooling the mixture while stirring until it congeals. The resulting absorption base may be readily triturated with aqueous material, at room temperature, or emulsified at elevated temperature, to form a smooth and stable water-in-oil emulsion. The compounds of the present invention are also useful in the preparation of cardiac active hormones.

The following examples will serve to illustrate the process and product of this invention, but the said invention is not to be considered as limited thereto.

*Example 1.—14α-hydroxyprogesterone*

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Five liters of this sterilized medium was inoculated with *Mucor griseocyanus*, ATCC 1207a(+), and incubated for 24 hours at a temperature of 25 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24-hour growth of *Mucor griseocyanus* was added five grams of progesterone in 250 milliliters of acetone to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride extracts with about three to five grams of anhydrous sodium sulfate per liter of solvent and filtering, the solvent was removed by distillation to yield a crystalline residue of 4.815 grams. The recovered crystalline residue was triturated with Skellysolve B petroleum ether, leaving 3.322 grams of insoluble material which was triturated with ether. A 1.718 gram sample of the ether insoluble material was dissolved in 100 milliliters of benzene and chromatographed over 85 grams of alumina (hydrochloric acid washed and activated by heating at 120 degrees centigrade). Developing solvents were added to the column in 170-milliliter portions as given in Table I.

TABLE I

| Fraction | Solvent | Eluate Solids, Milligrams |
|---|---|---|
| 1 | benzene | 1.1 |
| 2 | do | 0.4 |
| 3 | benzene plus five percent ether | 3.2 |
| 4 | do | 1.3 |
| 5 | benzene plus ten percent ether | |
| 6 | do | 96.0 |
| 7 | benzene plus fifty percent ether | 259.6 |
| 8 | do | 215.8 |
| 9 | ether | 143.5 |
| 10 | do | 84.3 |
| 11 | ether plus five percent chloroform | 104.4 |
| 12 | do | 66.9 |
| 13 | ether plus ten percent chloroform | 18.5 |
| 14 | do | 8.1 |
| 15 | ether plus fifty percent chloroform | 2.4 |
| 16 | do | 11.6 |
| 17 | do | 13.2 |
| 18 | do | 9.4 |
| 19 | chloroform | 39.0 |
| 20 | do | 474.4 |
| 21 | do | 81.6 |
| 22 | do | 40.5 |
| 23 | chloroform plus five percent acetone | 24.1 |
| 24 | acetone | 22.7 |
| 25 | methanol | 65.2 |

Fraction 22 was recrystallized from acetone to give 20 milligrams of a material having a melting point of 230 to 238 degrees centigrade. Infrared and ultraviolet spectra indicated a hydroxyl group and normal ketones (no conjugation).

Fractions 19 and 20 were combined and recrystallized from acetone to yield 382.5 milligrams of 14a-hydroxyprogesterone having a melting point of 180 to 187 degrees centigrade. The structure was confirmed by infrared spectra and the optical rotation $[\alpha]_D^{24}$ was plus 200 degrees (0.4857 in chloroform).

Analysis.—Calculated for $C_{21}H_{30}O_3$: C, 76.40; H, 9.15. Found: C, 76.50; H, 9.31.

Example 2.—14a-hydroxyprogesterone

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Twelve liters of this sterilized medium was inoculated with Helicostylum piriforme, ATCC 8992, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24 hour growth of Helicostylum piriforme was added six grams of progesterone in 275 milliliters of acetone to provide a suspension of the steroid in the culture. After an additional 27 hour period of incubation under the same conditions of temperature and aeration, the beer and mycelium were extracted according to the procedure of Example 1 to yield a crystalline residue of 8.313 grams which was dissolved in 600 milliliters of benzene plus ten percent ether and chromatographed over 300 grams of alumina (hydrochloric acid washed and activated by heating at 120 degrees centigrade). Developing solvents were added to the column in 600-milliliter portions as given in Table II.

TABLE II

| Fraction | Solvent | Eluate Solids, Milligrams |
|---|---|---|
| 1 | benzene plus ten percent ether | 95.6 |
| 2 | do | 121.9 |
| 3 | ether | 3.8 |
| 4 | do | 3.4 |
| 5 | ether plus five percent chloroform | 4.8 |
| 6 | do | 9.0 |
| 7 | do | 9.0 |
| 8 | ether plus ten percent chloroform | 16.5 |
| 9 | do | 18.0 |
| 10 | do | 10.0 |
| 11 | ether plus fifty percent chloroform | 19.0 |
| 12 | do | 115.0 |
| 13 | do | 175.6 |
| 14 | chloroform | 978.5 |
| 15 | do | 1432.0 |
| 16 | do | 461.0 |
| 17 | chloroform plus five percent acetone | 679.0 |
| 18 | do | 260.0 |
| 19 | chloroform plus ten percent acetone | 245.0 |
| 20 | do | 118.0 |
| 21 | chloroform plus fifty percent acetone | 246.0 |
| 22 | do | 135.0 |
| 23 | acetone | 187.5 |
| 24 | do | 65.5 |
| 25 | methanol | 299.0 |
| 26 | do | 21.5 |
| 0 | insoluble residue | 930.7 |

Fractions 12 through 14, inclusive, having a combined total weight of 1.269 grams, were recrystallized from fifteen milliliters of ethylacetate to give 0.680 gram of crystals having a melting point of 140 to 148 degrees centigrade. Repeated recrystallizations from methanol produced 165 milligrams of 14a-hydroxyprogesterone having a melting point of 191 to 199 degrees centigrade and an optical rotation $[\alpha]_D^{23}$ of plus 215 degrees (0.693 in chloroform).

Analysis.—Calculated for $C_{21}H_{30}O_3$: C, 76.40; H, 9.15. Found: C, 76.39; H, 9.36.

Example 3.—14a-hydroxyprogesterone

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Twelve liters of this sterilized medium was inoculated with Mucor parasiticus, ATCC 6476, and incubated for 20 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 20 hour growth of Mucor parasiticus was added three grams of progesterone in 150 milliliters of acetone to provide a suspension of the steroid in the culture. After an additional 48 hour period of incubation under the same conditions of temperature and aeration, the beer and mycelium were extracted according to the procedure of Example 1 to yield 4.667 grams of an oily residue which crystallized partially when triturated with thirty milliliters of ether whereupon the triturated product was dissolved in 150 milliliters of benzene and chromatographed over 220 grams of alumina (hydrochloric acid washed and activated by heating at 120 degrees centigrade). Developing solvents were added to the column in 200-milliliter portions as given in Table III.

TABLE III

| Fraction | Solvent | Eluate Solids, Milligrams |
|---|---|---|
| 1 | benzene | 73.0 |
| 2 | do | 26.5 |
| 3 | benzene plus five percent ether | 28.0 |
| 4 | do | 21.5 |
| 5 | benzene plus twenty percent ether | 35.0 |
| 6 | do | 27.5 |
| 7 | benzene plus fifty percent ether | 17.0 |
| 8 | do | 6.5 |
| 9 | ether | 4.5 |
| 10 | do | 5.0 |
| 11 | ether plus five percent chloroform | 7.5 |
| 12 | do | 9.5 |
| 13 | ether plus ten percent chloroform | 1,839.0 |
| 14 | do | 605.5 |
| 15 | ether plus twenty percent chloroform | 356.0 |
| 16 | do | 336.5 |
| 17 | ether plus fifty percent chloroform | 331.0 |
| 18 | do | 269.5 |
| 19 | do | 94.0 |
| 20 | chloroform | 68.0 |
| 21 | do | 22.0 |
| 22 | do | 15.0 [1] |
| 23 | chloroform plus five percent acetone | 18.0 [1] |
| 24 | do | 8.0 |
| 25 | chloroform plus ten percent acetone | 12.5 |
| 26 | do | 9.0 |
| 27 | chloroform plus fifty percent acetone | 26.5 |
| 28 | do | 29.5 |
| 29 | acetone | 62.0 |
| 30 | methanol | 77.0 |

[1] Combined.

Fraction 13 was dissolved in twenty milliliters of acetone and separated from an insoluble suspension by filtration. The clear solution was concentrated and diluted dropwise with ether to produce 585.5 milligrams of crystals having a melting point of 182 to 194 degrees centigrade. Eighty-five milligrams of this product were sublimed at 165 degrees centigrade and 0.05 millimeter pressure. The sublimate was recrystallized from three milliliters of acetone and hexane to give 14α-hydroxyprogesterone having a melting point of 195 to 200.5 degrees centigrade and an optical rotation $[\alpha]_D^{23}$ of plus 188 degrees (1.036 in chloroform).

*Analysis.*—Calculated for $C_{21}H_{30}O_3$: C, 76.40; H, 9.15. Found: C, 77.02; H, 9.55.

It is to be understood that the invention is not to be limited to the exact details or exact compounds shown and described, as obvious modifications and equivalents will be apparent to one skilled in the art, and the invention is therefore to be limited only by the scope of the appended claim.

We claim:

14α-hydroxyprogesterone.

HERBERT C. MURRAY.
DUREY H. PETERSON.

No references cited.